3,329,276
FLUID FILTER ELEMENTS
Herman C. Mouwen, Elberon, N.J., assignor to Purolator Products, Inc., Rahway, N.J., a corporation of Delaware
Continuation of application Ser. No. 339,459, Jan. 22, 1964. This application Aug. 10, 1966, Ser. No. 571,642
4 Claims. (Cl. 210—487)

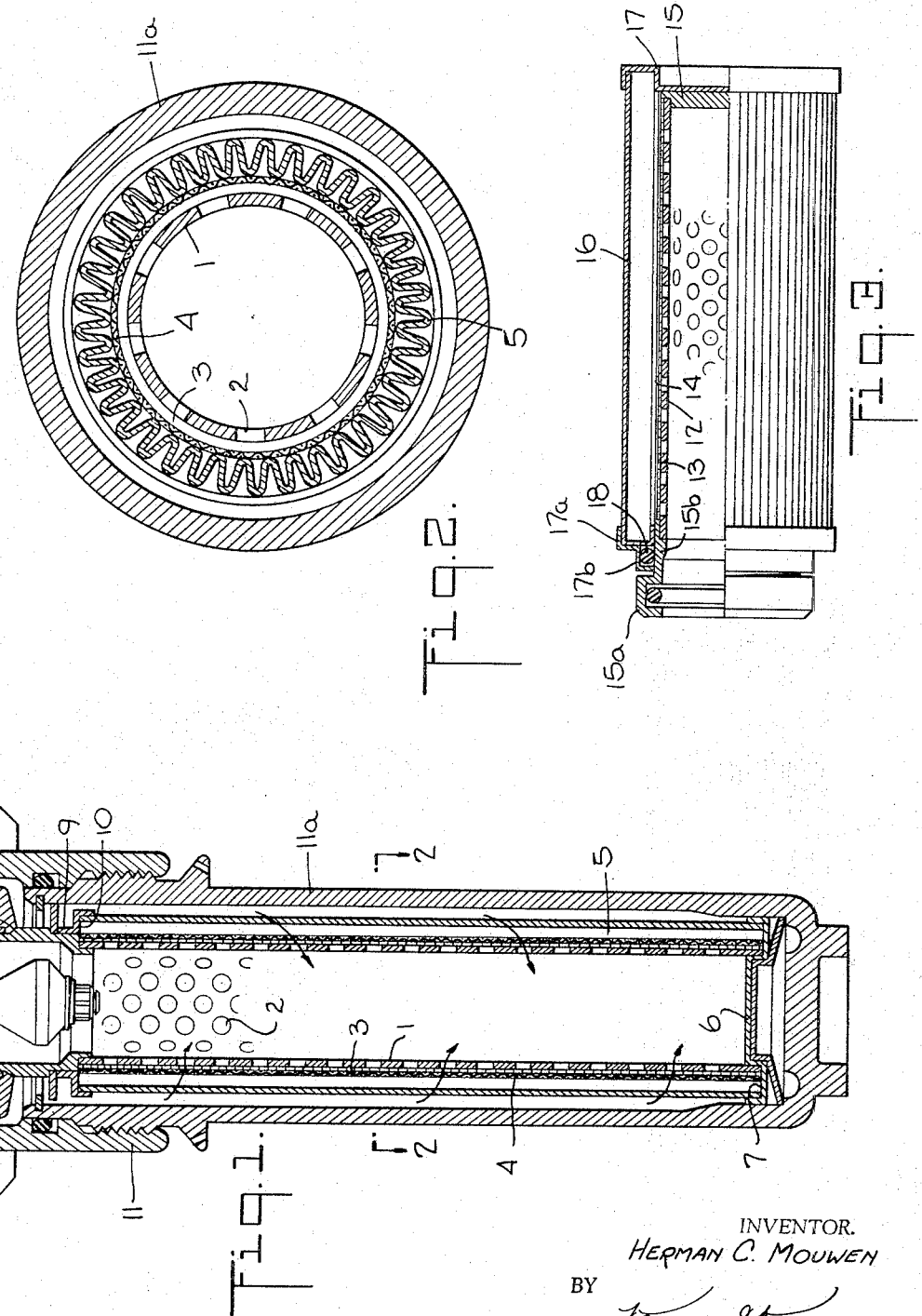

This application is a continuation of Ser. No. 339,459, filed Jan. 22, 1964 and now abandoned.

This invention relates to fluid filter elements particularly adapted for operation under high differential pressures but which may be used for operation under relatively low differential pressures.

For example, a filter intended to filter the hydraulic liquids of the hydraulic control systems of missiles and aircraft currently requires a filter element which will withstand collapse at a differential pressure of 4500 p.s.i. Its degree of filtration must be adequate to remove contaminants of extremely small particle size, such as in the neighborhood of 25 microns and usually smaller. In this connection, bubble testing is used to assure that the filter element has an absolute pore size. Further, the filter element must have adequate contaminant retention before it must be cleaned or replaced.

Long use of fibrous filtering material, particularly in the form of pleated paper filter elements in automotive oil filters, as one example, has proven the ability of such material to effect the above degree of filtration combined with adequate contaminant retention before becoming unserviceable. However, fibrous material such as paper has been excluded from service as a filter element under the conditions indicated above because it cannot resist the high differential pressures and does not have a uniform pore size as determined by bubble testing.

Therefore, wire mesh woven from stainless steel wires of exceedingly fine gage and tight weave have been used. The ability of this mesh to filter particles in the neighborhood of 15 micron particle size, for example, indicates the degree of tightness of weave and the small wire diameters required. Such wire mesh cloth is extravagantly expensive. To provide adequate contaminant retention before becoming unserviceable, it must be pleated and its formation after pleating into the customary annular shape with the pleats running longitudinally, and particularly the attachment of the pleated ends of this shape to the necessary end caps, have presented difficult manufacturing problems and resulted in extremely high manufacturing costs. But such mesh does have the necessary resistance to collapse and the uniform geometric shape of its pores does result in bubble testing showing that it has an absolute pore size.

Such woven wire mesh when produced by its manufacturer has the necessary uniform pore size throughout but the individual wires tend to become disarranged during the pleating and other steps required to produce the finished filter element. Within limitation, patching is possible under such conditions, but this adds even further to the manufacturing costs.

None of these troubles are inherent to the use of paper or other fibrous materials. Techniques for pleating paper, forming it into the familiar annular shape and attaching end caps to this shape, were worked out long ago in the automotive oil filter field in particular.

With the foregoing introduction, the present invention may be summarized briefly by stating that it uses the described woven wire mesh only to the extent of forming it into a simple shape free from pleats, such as a cylinder. Without the pleats the amount of mesh used is very small as compared to the prior art pleated shape and a wire mesh cylinder may have its ends attached to the necessary end caps without the difficulties inherent to the pleated wire mesh construction. The necessary longitudinal joint between the abutting longitudinally extending end edges of the mesh is simplified. Because of the simplicity of the shaping operation disarrangement of the wires of the mesh can be avoided with ease. The result is a filter element that can withstand the differential pressures as required and can meet the bubble test so as to show an absolute pore size, all at a relatively low cost.

However, because of the small area provided by such a cylindrical shape free from pleats, the contaminant retention is inadequate for practical application. Thus the area of the wire mesh is less than the area of wire mesh which would be required to filter contaminants without prematurely becoming loaded therewith so as to produce an excessive pressure differential between the upstream and downstream sides of the wire mesh. Obviously, only by pleating can the area effective for filtration purposes be increased to increase the contaminant retention without premature differential pressure increase to a prohibitive degree. This obvious fact has guided those skilled in the filter art away from any use of a cylinder or other simple shape of the woven wire mesh.

Now, according to the present invention, a pleated wall made of filter paper, or any fibrous filtering material suitable for the operating conditions to be encountered, is used in front of the upstream side, normally the outside, of the unpleated shape, such as the cylinder, of woven wire mesh. This pleated wall of fibrous filter material must provide a degree of filtration at least equal to that of the woven wire fabric. For example, if the wire mesh can filter out all particles of 15 micron particle size or greater, then the pleated fibrous material wall must correspondingly filter out at least everything having the same particle size or greater. The degree of filtration by the pleated fibrous material wall is preferably greater than that of the woven wire mesh wall. The idea is to keep the contaminants from reaching the wire mesh as much as possible, whereby the inadequate contaminant retention of the wire mesh wall is made immaterial.

Surprisingly, the pleated fibrous material wall which normally cannot withstand without collapse differential pressures anything like 4500 p.s.i., is unaffected when placed in front of or on the upstream side of the woven wire mesh. The pleated fibrous filter wall provides the necessary area for contaminant loading before excessively resisting the liquid flow. The wire mesh provides the uniform pore size and permits properly conducted bubble testing to show an absolute pore size.

Being fibrous and either paper or capable of being made like paper, the fibrous wall material is extremely inexpensive as compared to the wire mesh fabric and it presents no unusual problems concerning pleating, its longitudinal seaming or its attachment to the necessary end caps after pleating.

In the case of the usual outside-in filter element using pleated wire mesh, the latter is braced against collapse by a heavy-walled perforated metal supporting tube and flat wire having projections on one of its faces is helically wound to form a layer between this supporting tube and the wire mesh to provide drainage for the latter while preventing extrusion of the wire mesh through the perforations of the tube. This same arrangement may be used to internally support the cylinder of unpleated wire mesh of the present invention.

The present invention does not involve the principle of what is usually called progressive filtration. The latter consists in locating on the upstream side of a fine filtration wall a coarser filtration wall which removes the larger particles from the fluid stream, the next wall of the fine filtration character then removing the small particles passed by the first wall. In the case of the present invention, the fibrous filtering wall must have an ability at least equal to and preferably greater than that of the woven wire mesh wall to remove particles of any given size, because the concept is to prevent the wire mesh wall from carrying the burden of filtering the smallest particle size which the filtering element as a whole is intended to remove from the flow of liquid.

It should now be plain that the purpose or object of the present invention is to reduce the cost of filters of the character described which must use wire mesh to provide pore openings of the uniformity necessary to meet bubble testing requirements for absolute pore size ratings and which will, at the same time, have an equal if not greater dirt retention capacity as the much more expensive prior art type using the pleated wire mesh construction. Because of the cost of the latter, it is necessarily made as a reusable element requiring cleaning when it becomes too loaded with contaminants to continue in service, whereas the much lower manufacturing cost of a filter element made in accordance with the present invention permits the elements to be made entirely or partly as a throwaway device replaceable by a new part.

Specific examples of the present invention as adapted for use in missile and aircraft hydraulic control liquid filtration, are illustrated by the accompanying drawings in which:

FIG. 1 is a longitudinal cross section of the filter element installed in a typical filter casing of which only the lower portion is shown;

FIG. 2 is a cross section taken on the line 2—2 in FIG. 1; and

FIG. 3 shows a second example of a filter element, shown in this instance by itself, half in elevation and half in longitudinal section to expose its construction.

Referring first to FIGS. 1 and 2, the filter element comprises the internal supporting tube 1 having a thick strong wall and perforations 2 distributed throughout its length and circumferentially. On the outside of this wall is wound the drainage layer 3 which may be made, for example, as described by the Kovacs Patent 2,622,738, dated Dec. 23, 1952. However, this layer 3 does not function as a filter in the sense of removing particles from the flow of liquid being filtered. Instead, it functions to prevent extrusion of the wire mesh through the perforations 2 by the extremely high differential pressures under which a filter element of this type must operate.

The wire mesh cylinder 4 is in the described form of a simple cylinder. It is free from pleats or other shapes other than for being a straight-walled cylinder. This permits using the minimum amount of the very expensive woven wire mesh. In addition, it eliminates the problems connected with pleating such wire mesh and of fastening the pleated ends to the necessary end caps. Side seaming required to form the unpleated cylinder wall 4 is a relatively easy operation. When forming the cylinder there is little chance for the individual wires of the woven wire mesh to become displaced and, therefore, patching is substantially eliminated for the purpose of permitting the element to meet the bubble test for absolute pore size which, of course, requires a uniform pore size throughout the element.

Finally, the pleated paper wall 5 is shown surrounding the outside of the wire mesh wall 3 and protecting the latter from becoming loaded with the contaminants which must be filtered from the liquid stream. If made of ordinary resin bonded filter paper such as is used for automotive type oil filters in general, the illustrated element is capable of operating in the temperature range of from $-65°$ F. to $+275°$ F. when handling the ordinary hydraulic fluids commonly used in missile and aircraft hydraulic control systems.

The element as a whole is capable of resisting collapse up to 4500 p.s.i. differential pressures because the components 1, 3 and 4 are substantially the same as are commonly used in the case of the prior art pleated wire mesh type, and because of the previously mentioned phenomena concerning the pleated paper element. Although having the same or better degree of filtration, the paper element apparently somehow or other relieves itself from the high differential pressure insofar as its upstream and downstream sides are concerned.

The bottom end cap of the element illustrated by FIGS. 1 and 2 comprises a simple metal member in the form of a disk 6 shaped to form an annular peripheral channel 7 in which all of the components nest. The metal components may be sealed to this end cap by brazing, welding or suitable adhesive cement, and the paper component may be sealed in any usual fashion such as with cement.

The other end cap is annular and includes the upstanding collar 8 required for fitting the element into the parts of what may be any suitable casing head designed for the high pressure hydraulic control systems used in missile and aircraft systems. An annular collar 9 is fixed to and co-operates with this part 8 to form a channel 10 in which the other or opposite ends of the described filter element are sealed as described before.

The filter casing itself is shown only as to its bottom parts, these including the depending internally threaded member 11 into which the casing cup 11a is releasably screwed to permit removal of the filter element. All of these parts are, of course, made with thick walls to resist the high pressures encountered in filters of this type are not described because they need not be understood to appreciate the teaching of the present invention. However, the flow path of the liquid being filtered is indicated by arrows.

This filter element shown by FIGS. 1 and 2 is of the throw-away type. After the paper elements becomes excessively loaded with contaminants, the casing cup 11a may be unscrewed, the filter element comprising the parts 1–10 removed, and a new element of the same kind substituted. This is possible because the cylinder construction of the expensive woven wire mesh involves so little area or amount of this material. The other components are not unusually expensive.

Substantially the same construction is shown in the case of the filter element of FIG. 3 excepting that the metallic components of the element generally comprising the perforated center tube 12, the drainage winding 13 and the woven wire mesh cylinder 14 are integrated permanently with an end cap 15 at one end and with an annular end cap 15a at the other end. The pleated paper element 16 is integrated with an end cap 17, at the end cap 15, and with an annular collar 17a at its other end, both of which are removable from the all-metallic portion of the element. The end cap 17a is shaped to form an inwardly facing channel 17b in which an O-ring 18 is placed for sealing against a shank 15b formed on the annular end cap 15a. In this instance, when the paper element becomes unusable because of being loaded with contaminants, it may be slid longitudinally from the metallic components, the latter may be cleaned, and a new paper component substituted for the old.

Although the word "paper" has been used hereinbefore, any suitable fibrous layer that can be pleated or otherwise shaped to increase its area in a compact manner and handled easily may be used instead. For example, ordinary automotive oil filter type paper may not be serviceable under certain operating conditions, and this may require the use of other fibrous materials. The usual resin bonding may have to be substituted by some other material. Generally speaking, those skilled in the art of making filters are familiar with various fibrous materials which are in general made like paper and can be handled in the manner of paper although possessing differing properties both chemically and physically.

In all cases the pleated paper or other fibrous material element does substantially all of the filtering. It passes the liquid so readily as to permit this element to operate at differential pressures well below the collapsing strength of this part as these pressures are applied to the element in its entirety. The clean liquid then goes through the simple cylindrical layer of woven wire mesh. The latter provides the positive predetermined pore size required to give an absolute pore size rating during the bubble test and, incidentally, required to make absolutely certain that no contamination above that pore size goes along with the filtered liquid. The high differential pressures exist between the opposite sides of the three metallic components which can carry the load without collapsing.

To exemplify the saving in the woven wire mesh fabric, for a typical filter element size of 3.5 gallons permanent flow rate, only 6 square inches of the woven wire fabric mesh are used by the present invention as compared to about 75 square inches required by the prior art pleated woven wire mesh construction. At the same time, because of the pleated paper filter part of the filter made according to the present invention, the contaminant holding capacity is substantially greater, the gas pressure required to form the bubble during bubble testing is increased, the degree of filtration is increased to some measure and other properties are enhanced, all as compared to prior art pleated wire mesh elements designed for the same flow rates.

In the foregoing, emphasis has been placed on fibrous material as exemplified by paper, because this provides for the least expense in connection with the manufacture of the filter element. However, other materials having an adequate degree of filtration and contaminant holding capacity may be used if inexpensive enough to permit application to the throw-away concept. For example, if it can be made inexpensively enough, a sintered metal component might be used in front of or on the upstream side of the cylinder of woven wire mesh which provides the positive or absolute pore size required to meet the bubble test. Other technical developments in the filter field might provide other substitutes for non-metallic fibrous material.

In the foregoing, reference has been made to the tube 1 being thick walled. This term is relative because with use of high strength metal the tube wall may be thinner than when lower strength metal is used. However, in all cases the tube must be strong enough to resist collapse under the differential pressure involved.

The drainage layer may be made otherwise than as described by the aforementioned Kovacs patent. A coarse cloth may possibly be substituted. The described function of this layer should be effected, however.

What is claimed is:

1. An outside-in filter element for use under high differential pressures, including wire mesh fabric woven from fine-gauged metal wires and having a substantially uniform pore size of 25 microns or less permitting the use of bubble testing to show the absolute pore size of this fabric, the latter being in the form of a simple straight-walled cylinder free from pleats and other irregular shapes in the surface of the cylinder and through which the fluid to be filtered flows inwardly, means for internally supporting said cylinder against inward deformation thereof due to the pressure of said fluid while permitting the fluid flow inwardly therethrough, a wall of filtering material having a non-uniform pore size to a degree preventing it from being bubble tested to determine its absolute pore size with certainty, said wall surrounding the outside of said cylinder and having a filtering surface disposed substantially parallel to the surface of said cylinder, said material having a degree of filtration at least equal to that of said mesh and a contaminant loading capacity substantially greater than that of said cylinder, and means for causing all of said fluid which flows inwardly through said cylinder to first flow inwardly through said wall and then through the cylinder, said material pores passing said fluid flow more readily than does said mesh fabric pores during said flow to form means providing a pressure differential across said material substantially less than said high differential pressures to avoid collapse of said material against said cylinder due to said high differential pressures.

2. The filter element of claim 1 in which said wall of filtering material is in the form of fibrous material surrounding the outside of said cylinder and the second-named means is in the form of end caps closing all spaces between the ends of said wall and cylinder.

3. The filter element of claim 2 in which said end caps are permanently sealed in connection with said ends of said wall and cylinder so that the filter element is of the throw-away type.

4. The filter element of claim 2 in which said end caps include one end cap in the form of a disk joined with one end of said cylinder and its said internally supporting means so as to close this end and an annular end cap joined with the other end of said cylinder and forming an axially extending shank, and an end cap joined with the end of said wall at the first-named end of said cylinder and completely closing that end of said wall outside of said disk and an end cap in the form of an annular collar joined with the other end of said wall and surrounding said shank, said cylinder and the end caps joined therewith being removable axially from said wall and its said end caps joined therewith, and means for releasably sealing fluid-tightly said shank and annular collar when said cylinder is inside of said wall.

References Cited

UNITED STATES PATENTS

| | | | |
|---|---|---|---|
| 2,047,793 | 7/1936 | McKinley | 210—489 X |
| 2,395,449 | 2/1946 | Briggs | 210—489 |
| 2,743,017 | 4/1956 | Kovacs | 210—315 |
| 3,007,238 | 11/1961 | Pall | 210—493 X |
| 3,007,334 | 11/1961 | Pall | 73—45.5 X |
| 3,007,579 | 11/1961 | Pall | 210—489 |
| 3,189,179 | 6/1965 | McMichael | 210—489 X |

REUBEN FRIEDMAN, *Primary Examiner.*

D. M. RIESS, *Assistant Examiner.*